United States Patent [19]

Hattori et al.

[11] Patent Number: 5,584,994
[45] Date of Patent: Dec. 17, 1996

[54] APPARATUS FOR MANUFACTURING MAGNETIZED WATER AND MAGNETIC FORCE GENERATOR USED THEREFOR

[76] Inventors: Toshimitsu Hattori, 20-36, Ishimaru 2-chome, Nishi-ku, Fukuoka-shi, Fukuoka 819; Masaru Ohta, 5-37-501, Sakurazaka 3-chome, Chuo-ku, Fukuoka-shi, Fukuoka 810, both of Japan

[21] Appl. No.: 449,884

[22] Filed: May 25, 1995

[30] Foreign Application Priority Data

Nov. 25, 1994 [JP] Japan .................................. 6-291799
Nov. 25, 1994 [JP] Japan .................................. 6-291800

[51] Int. Cl.$^6$ ........................................ C02F 1/48
[52] U.S. Cl. ........................... 210/195.1; 210/222
[58] Field of Search ........................ 210/222, 695, 210/195.1

[56] References Cited

U.S. PATENT DOCUMENTS

| 5,009,791 | 4/1991 | Lin et al. ........................... 210/695 |
| 5,034,138 | 7/1991 | Hatanaka et al. ................... 210/222 |
| 5,178,757 | 1/1993 | Corney ............................... 210/695 |
| 5,500,121 | 3/1996 | Thornton et al. .................... 210/222 |

FOREIGN PATENT DOCUMENTS

| 59-189989 | 10/1984 | Japan ................................. 210/222 |
| 63-116797 | 5/1988 | Japan ................................. 210/222 |
| 2-160092 | 6/1990 | Japan ................................. 210/222 |

*Primary Examiner*—Matthew O. Savage
*Attorney, Agent, or Firm*—Webb Ziesenheim Bruening Logsdon Orkin & Hanson, P.C.

[57] ABSTRACT

Pure water discharged from a pure water tank 9 by means of a pump 27 is returned again to the tank 9 through a cyclic water channel 37. Midway in the cyclic water channel 37, a magnetic force generator 31 is provided. In the magnetic force generator 31, permanent magnets are arranged in such a manner that they interpose therebetween three water channels each made of a non-magnetic material and each having a long and narrow section and that magnetic poles of the magnets face each other outside the longer side of the section.

7 Claims, 14 Drawing Sheets

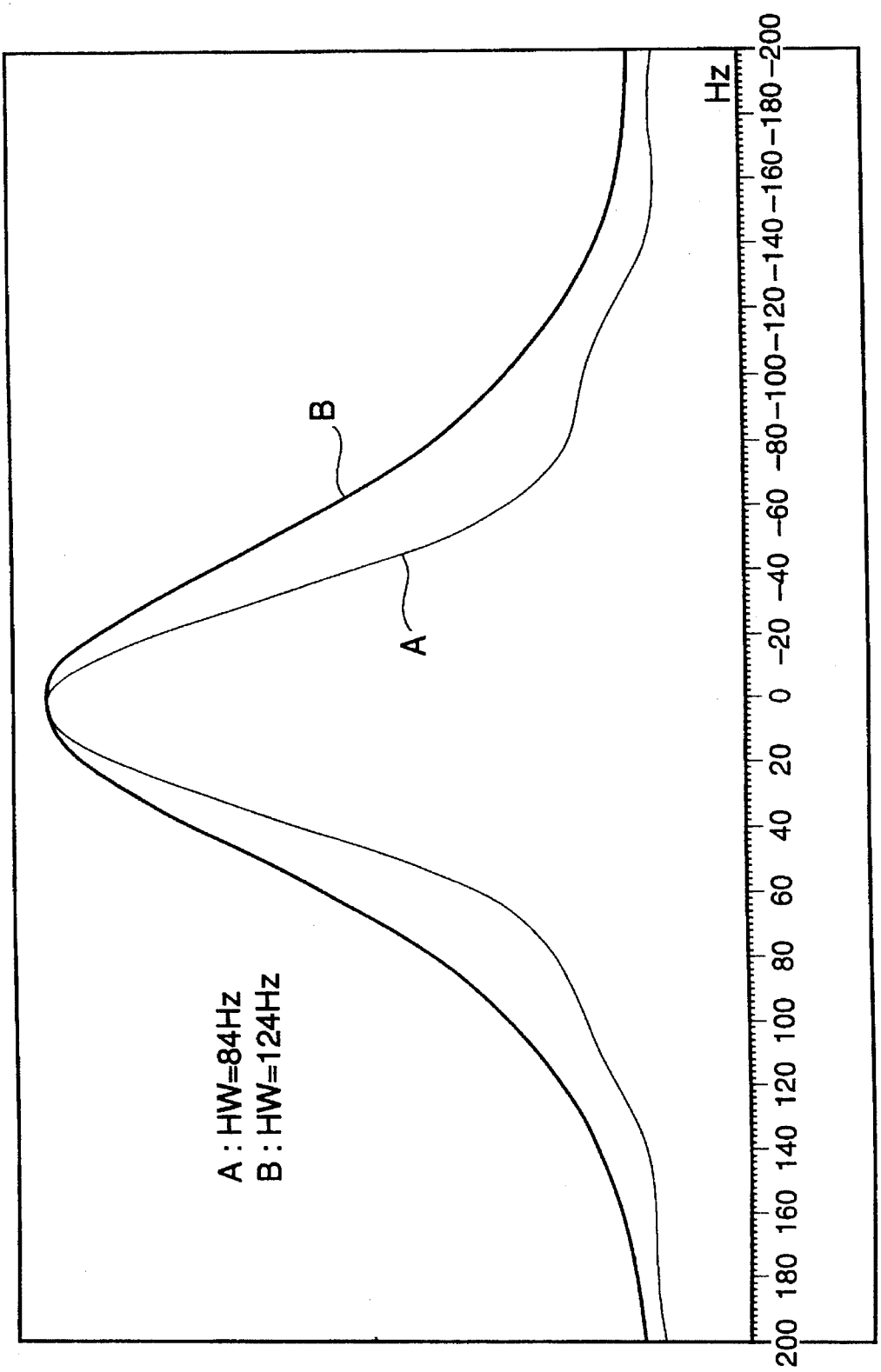

5,584,994

APPARATUS FOR MANUFACTURING MAGNETIZED WATER AND MAGNETIC FORCE GENERATOR USED THEREFOR

FIELD OF THE INVENTION

The present invention relates to an apparatus for manufacturing magnetized water suitable for lotions and to a magnetic force generator used for the apparatus.

BACKGROUND OF THE INVENTION

Magnetized water manufactured by applying a magnetic force to water has come to be recently used for lotions. The magnetized water has been conventionally manufactured by arranging permanent magnets in a water tank for storing water in such a manner that different magnetic poles of the magnets face each other, and magnetizing water present between the different magnetic poles.

However, if a magnetic force is applied to almost all water stored in the water tank, large-sized or a great number of permanent magnets are required, because the water tank for storing water has a size of a certain level or more. This results in requirement of a large-sized apparatus.

In addition, a gap between the permanent magnets arranged face to face with each other cannot be made so small in the conventional apparatus. If the gap is made so small, the size or the number of the permanent magnets must be made larger. Further, if the gap is made so small, a possibility that impurities attach to the surfaces of the permanent magnets becomes high thereby to render the apparatus insanitary, because the water stored in the tank is still.

In order to solve such problems as mentioned above, the inventors found that an apparatus for manufacturing magnetized water comprising a cyclic water channel through which water is sent forth from a water tank and returned to the tank and a magnetic force generator disposed midway in the cyclic water channel is advantageous. In the apparatus, the size or the number of the permanent magnets can be made smaller. Moreover, the possibility of impurity attachment can be reduced.

In a magnetic force generator used for the apparatus for manufacturing magnetized water, however, replacement of the permanent magnets with new ones may be troublesome. That is, in order to apply a strong magnetic force to a water stream in the cyclic water channel, it is desired that the distance, i.e., gap, between the permanent magnets arranged interposing the water stream therebetween is made as small as possible. However, if the permanent magnets are incorporated in the water channel for the purpose of making the gap smaller, the whole generator must be replaced for the replacement of the permanent magnets. In order to replace the whole generator, however, the water stream in the cyclic water channel must be temporarily stopped, and this means that the operation of the magnetized water manufacturing apparatus must be stopped.

OBJECT OF THE INVENTION

The present invention has been made to solve the problems of the prior art mentioned above, and it is an object of the invention to provide an apparatus for manufacturing magnetized water which does not need to be made large-sized and can avoid becoming insanitary.

It is another object of the invention to provide a magnetic force generator for manufacturing magnetized water in which only permanent magnets can be replaced without replacing the whole magnetic force generator.

SUMMARY OF THE INVENTION

The apparatus for manufacturing magnetized water of the invention comprises a water tank for storing water to be treated, a pump for sending forth the water from the tank, a cyclic water channel for returning the water to the tank and a magnetic force generator disposed midway in the cyclic water channel for generating a line of magnetic force almost perpendicular to the water stream.

In the cyclic water channel, plural magnetic force generators may be arranged in parallel.

Further, plural magnetic force generators may be arranged in series in the cyclic water channel.

According to the apparatus for manufacturing magnetized water of the invention, the water stored in the tank is discharged by means of the pump and the water is returned to the tank through the cyclic water channel. While the water passes through the cyclic water channel, a magnetic force generated by the magnetic force generator provided midway in the cyclic water channel applies to the water. The line of magnetic force is almost perpendicular to the narrow cyclic water channel, whereby a stronger magnetic force is allowed to act on the water.

If plural magnetic force generators are prepared and arranged in parallel in the cyclic water channel, a large quantity of magnetized water can be manufactured at the same time.

If plural magnetic force generators are prepared and arranged in series in the cyclic water channel, water can be magnetized with a stronger magnetic force in one cycle.

The magnetic force generator of the invention is provided midway in a water channel and generates a line of magnetic force almost perpendicular to the water stream. This magnetic force generator comprises a water channel main body constituting a part of the water channel, said water channel main body having a long and narrow section and formed from a non-magnetic material, permanent magnets arranged outside the longer side of the section, said permanent magnets interposing the water channel main body therebetween so as to allow different magnetic poles of the magnets to face each other, and press boards for holding on the permanent magnets on the water channel main body in the united form.

According to the magnetic force generator of the invention, the permanent magnets can be separated from the water channel main body by unfixing the press board, and thereby the permanent magnets can be replaced while leaving the water channel main body as it is. Accordingly, only the permanent magnets can be replaced without replacing the whole magnetic force generator.

BRIEF DESCRIPTION OF THE DRAWING

FIG. 14 is a graph showing $^{17}$O-NMR charts obtained by measuring tap waters of Akishima-shi and Nerima-ku.

DETAILED DESCRIPTION OF THE INVENTION

One embodiment of the present invention will be described below with reference to FIG. 1 to FIG. 9.

Figure 1:
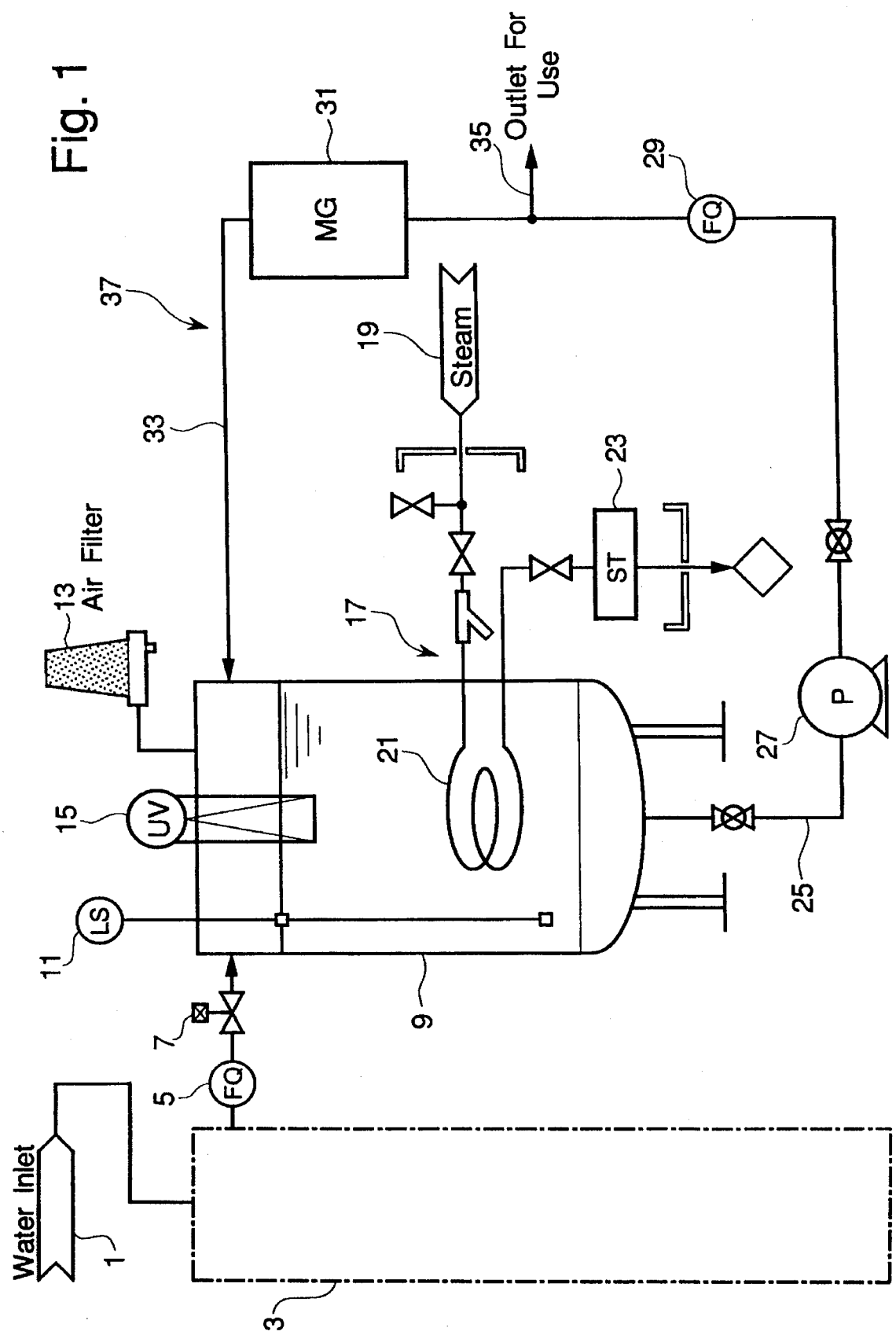
FIG. 1 is a schematic view of the whole apparatus for manufacturing magnetized water according to the present invention.

FIG. 1 is a schematic view of the whole magnetized water manufacturing apparatus according to the invention. In this figure, raw water such as tap water is introduced into a pretreatment device 3 through a water inlet 1. In the pretreatment device 3, the raw water is treated with various filters to remove inorganic ions, TOC, bacteria, fine particles, etc. to a given extent, so as to give pure water. The pure water passes through a flow rate measuring instrument 5 and a valve 7, and is stored in a pure water tank 9. This pure water tank 9 is equipped with a level switch 11 for adjusting the water surface level. The level switch 11 controls the valve 7 to adjust the water surface level. Because of variation of the water surface level, the pure water tank 9 is provided with a breathing hole for allowing air to freely-go in and out. This breathing hole is provided with an air filter 13 to inhibit various bacteria from invasion from the outside. The pure water tank 9 is further provided with an ultraviolet sterilizer 15 for always sterilizing the pure water in the tank, whereby any bacteria invading the pure water tank through the air filter 13 become extinct.

In order to complete the sterilization, a steam heater 17 is fixed inside the pure water tank. The steam heater 17 periodically raise the temperature of the pure water in the pure water tank 9 to about 85° C., so as to sterilize the pure water. That is, steam 19 is sent into the pure water tank through a tube, and the steam raises the temperature of the pure water when it passes through a coil tube 21. Then, the steam is discharged from the tank and separated into water vapor and water by a steam trap (ST) 23.

The bottom of the pure water tank 9 is provided with an outward pipe 25 for sending forth the pure water, which is connected with a pump 27. The outward pipe 25 connects the pump 27 with a flow rate measuring instrument 29 and a magnetic force generator 31 so that the pure water is further sent by the pump 22 and advances toward the magnetic force generator 31 by way of the flow rate measuring instrument 29. The magnetic force generator 31 generates a line of magnetic force almost perpendicular to the stream of the pure water in the outward pipe 25. Details of the magnetic force generator 32 will be described later.

The pure water leaving the magnetic force generator 31 is returned into the upper part of the pure water tank 9 through an inward pipe 33. On the lower course of the outward pipe 25 than the pump 27, an outlet for use 35 is provided to discharge the water having been magnetized by the sufficient circulation. The outward pipe 25 and the inward pipe 33 together form a cyclic water channel 37.

Next, the magnetic force generator 31 according to the invention is described in more detail with reference to FIGS. 2 to 7.

Figure 2:
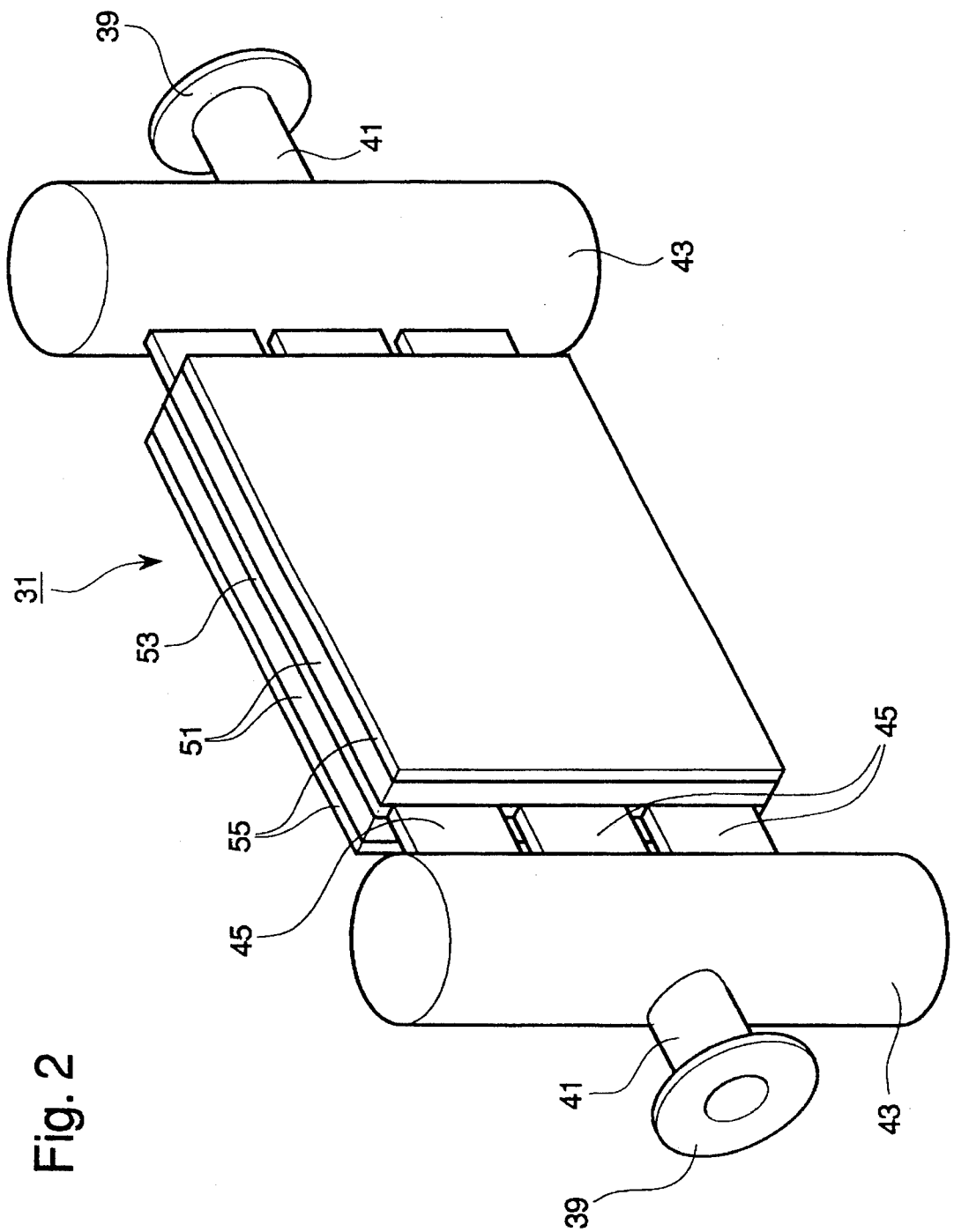
FIG. 2 is a schematic perspective view of the whole magnetic force generator provided in the cyclic water channel shown in FIG. 1.
Figure 3:
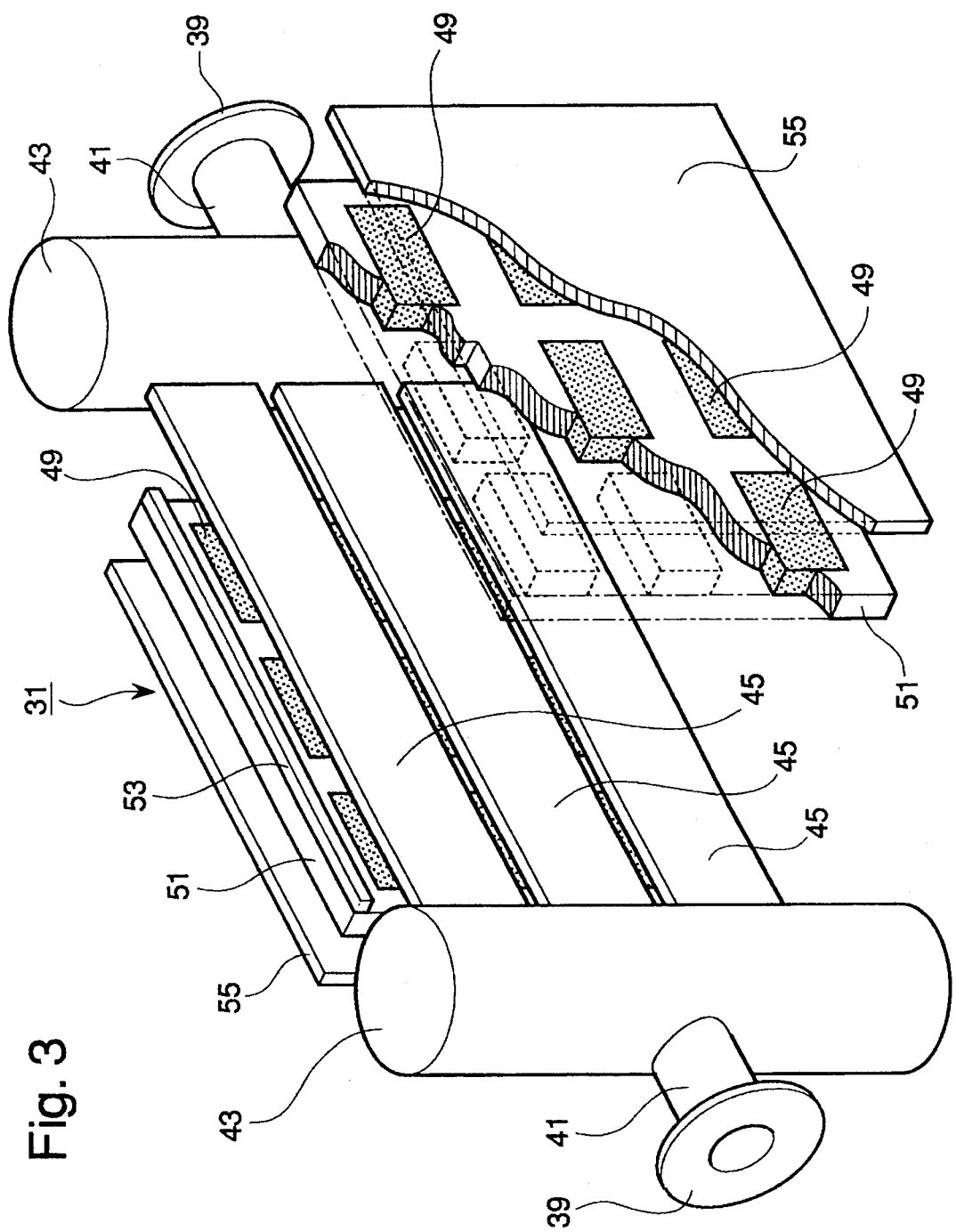
FIG. 3 is an outside part-exploded, partially cutaway view of the magnetic force generator of FIG. 2.
Figure 4:
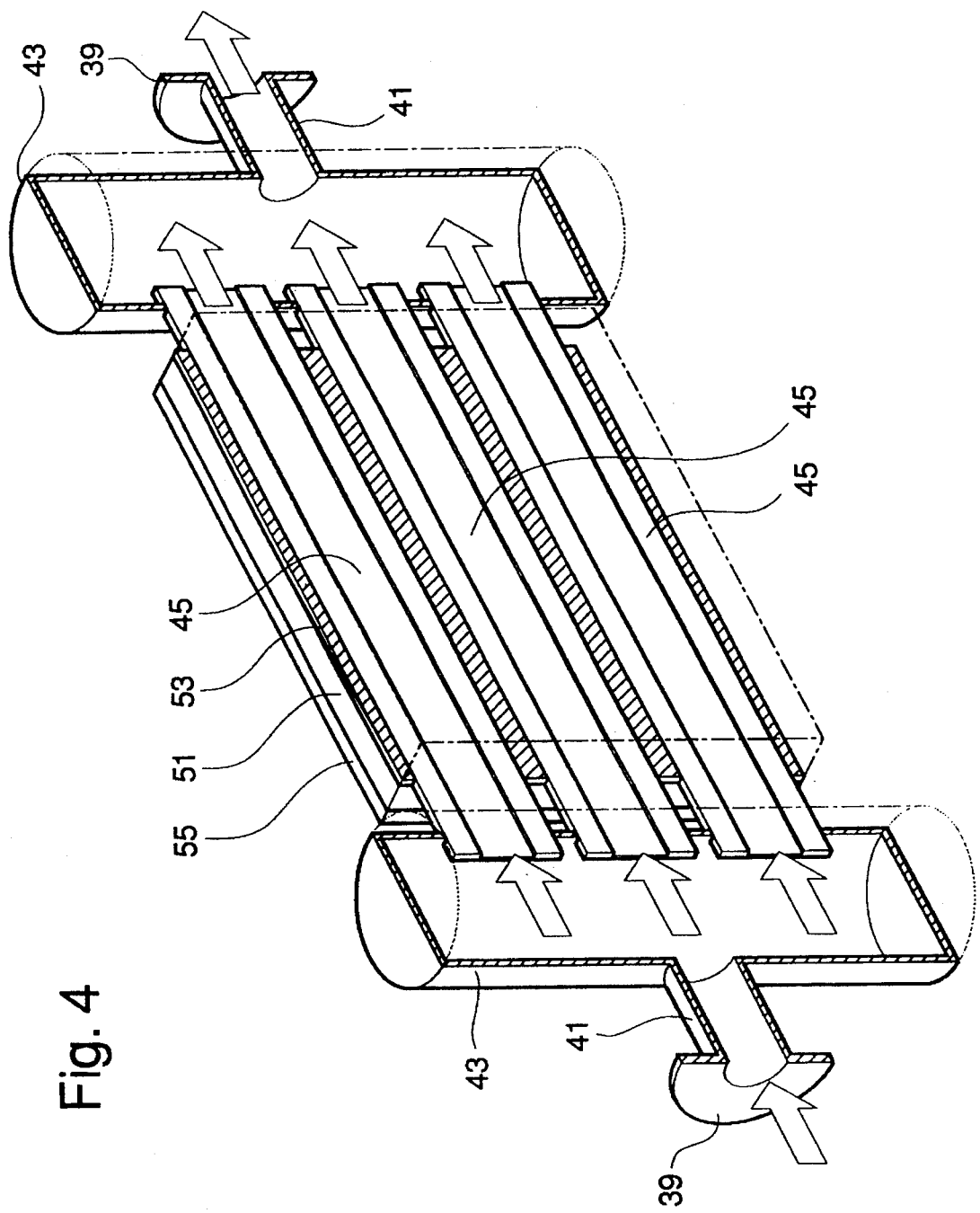
FIG. 4 is a vertical sectional view of FIG. 2.

As shown in FIG. 2, the magnetic force generator 31 has at its each end a flange 39 to connect the generator with the cyclic water channel 37 in series. This flange is fixed to a connecting pipe 41 which is provided at each end of the generator. The connecting pipes 41 are connected at the other ends with chambers 43, respectively. The chambers 43 are connected with each other through three pipes 45 for branching (branching pipes 45). These flanges 39, connecting pipes 41, chambers 43 and branching pipes 45 are all made of stainless steel (JIS No.SUS-304), and their inner and outer surfaces are subjected to abrasion finishing to form sanitary piping. Further, the flanges 39, the connecting pipes 41, the chambers 43 and the three branching pipes 45 are united in one body by means of welding or the like to form a water channel main body in which the pure water actually runs.

Figure 5:
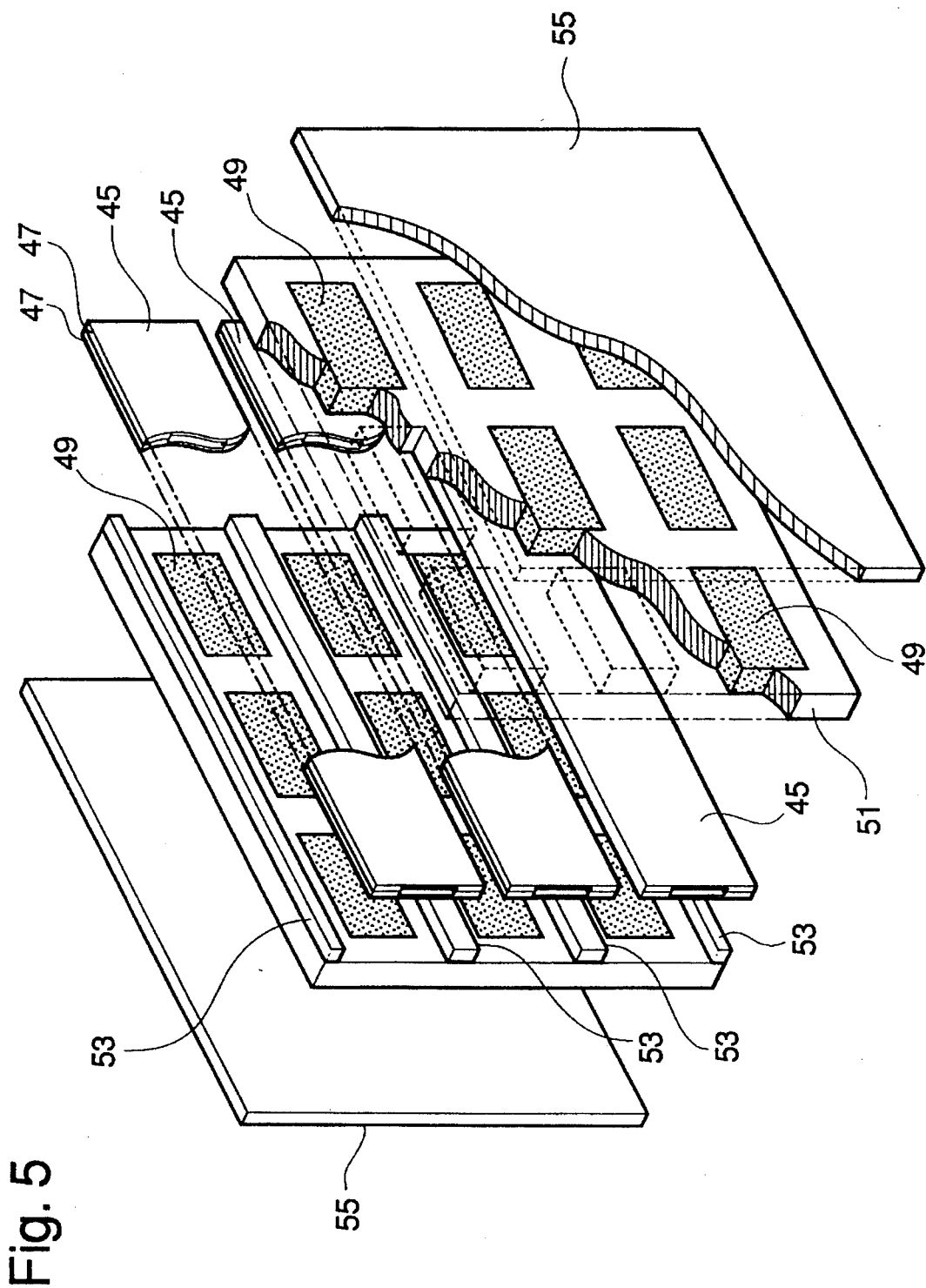
FIG. 5 is an exploded perspective view of the central part of FIG. 2 in the right-left direction.
Figure 7:
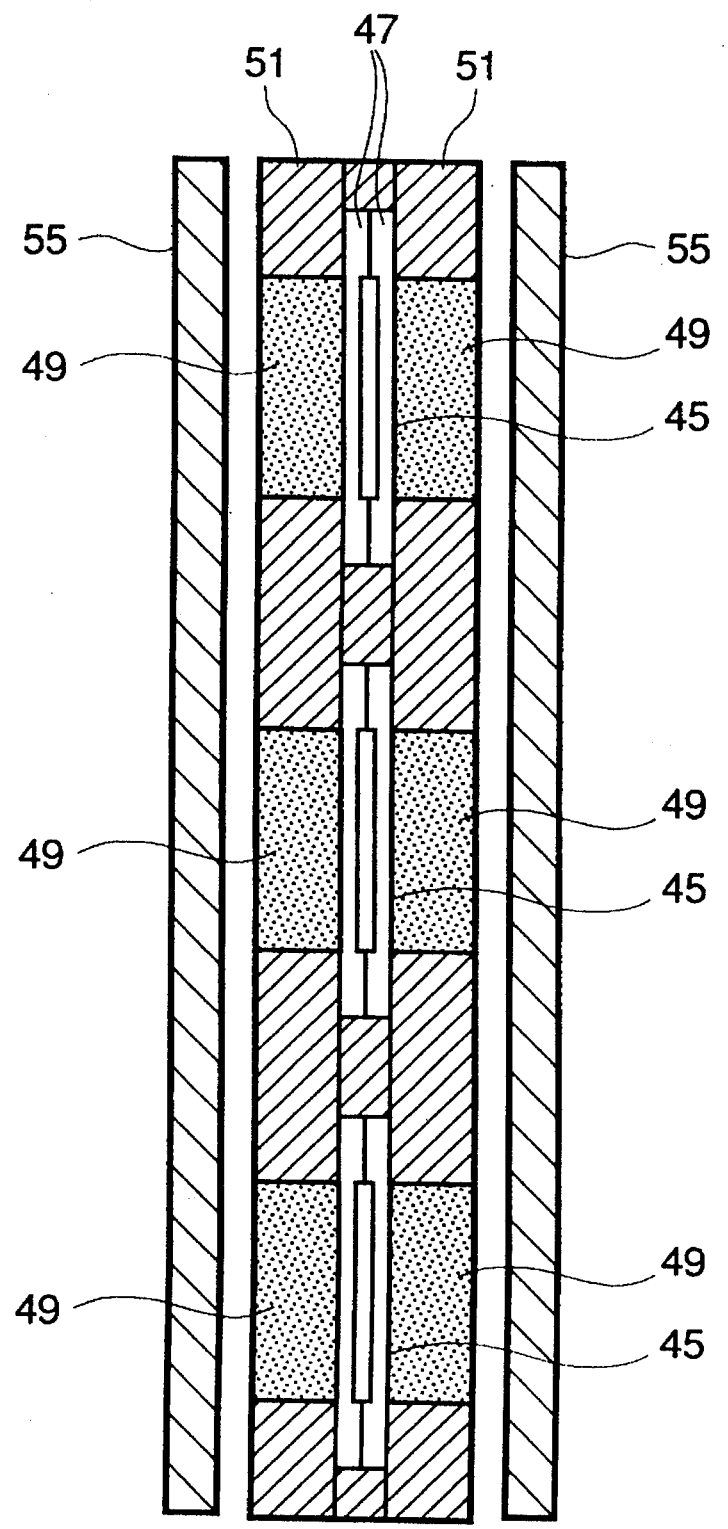
FIG. 7 is a vertical sectional view of the central part of FIG. 2.

Each of the branching pipes 45 has a transverse section (opening section) of a long and narrow rectangular shape as shown in FIGS. 5 and 7. That is, two of flat and channel-shaped members 47 are combined together by means of welding or the like. The shorter side of the long and narrow rectangle has a length of about 2 mm. The three branching pipes 45 are arranged on almost the same plane so that their long and narrow rectangular sections are aligned in the direction of the longer side.

Figure 6A:
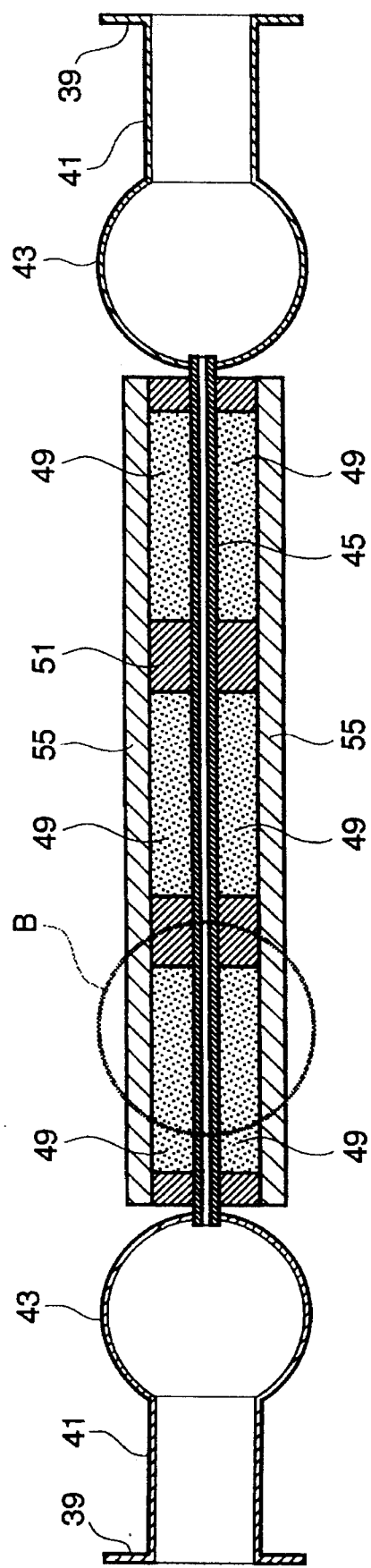
FIG. 6(A) is a transverse sectional view of FIG. 2.
Figure 6B:
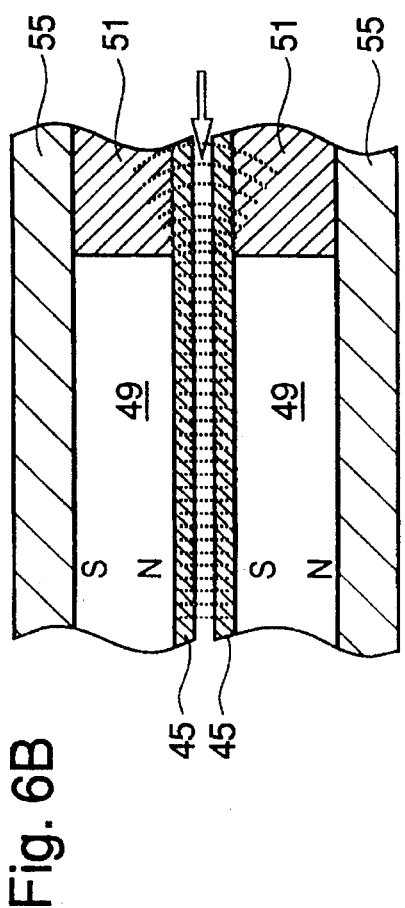
FIG. 6(B) is an enlarged view of the part B of FIG. 6(A).

Outside the longer side of the long and narrow rectangular section of the branching pipe 45, pairs of permanent magnets 49 are arranged in such a manner that they interpose therebetween the branching pipes 45 and that their different magnetic poles (S, N) face each other. In this embodiment, each of the permanent magnets 49 is in the form of a flat rectangular parallelepiped. The magnetic poles (S, N) are present on the largest two surfaces of the rectangular parallelepiped as shown in FIG. 6(B). When one magnet of a pair of magnets 49 is arranged in such a manner that its S pole surface faces one surface of the branching pipe 45, the other of the magnets 49 is arranged in such a manner that its N pole surface faces the other surface of the branching pipe 45.

In this embodiment, three pairs of permanent magnets 49 are used per one branching pipe 45, that is, nine pairs of permanent magnets 49 are used in total. The nine permanent magnets on each side are encased in one magnet encasing board 51 made of PVC (polyvinyl chloride). The encasing of the permanent magnets 49 in the magnet encasing board 51 may be conducted by incorporating the magnets 49 and the board 51 in one, or may be conducted in such a manner that the magnets 49 can be removed one by one from the board 51. Such a pair of magnet encasing boards 51 as mentioned above are arranged so that the branching pipes 45 are interposed between the boards 51 by way of spacers 53 provided between the three branching pipes 45.

Outside the each magnet encasing board 51, a press board 55 is provided to hold the magnet encasing boards 51 encasing the permanent magnets and the branching pipes 45 together as one united body. The press board 55 is made of PVC (polyvinyl chloride).

The holding may be carried out by screwing covers (not shown in figures) provided outside the press boards 55. In detail, a pair of covers having almost channel-shaped transverse section are screwed at screwing flanges each formed at the edge of each cover. Alternatively, the plural pairs of a nut and a bolt penetrating the press board 55 and the magnet encasing board 51 on one side, passing through the branching pipes 45 and further penetrating the other magnet encasing board 51 and press board on the other side may be used for holding them together. This press board is made of PVC similarly to the magnet encasing board.

The function of this embodiment is described below.

The pure water tank 9 has a volume of, for example, 1 m$^3$, and the magnetization of all water is carried out over a period of, for example, 24 hours. In detail, the pump 27 is continuously operated to repeatedly send forth the pure water of the tank 9 into the cyclic water channel 37, whereby the water is circulated. Even if the magnetized water is diluted with unmagnetized pure water in the tank 9, it can be sufficiently magnetized finally owing to the repeated circulation of the water. The circulating pure water is magnetized with a strong magnetic force when it runs within the branching pipes 45 of the magnetic force generator 31. This strong magnetic force can be attained by arranging the permanent magnets 49 having a high magnetic flux density (12,000 gauss) in such a manner that the narrow water channels of the branching pipes 45 are interposed between the permanent magnets 49.

By arranging pairs of the permanent magnets 49 in such a manner that they face each other interposing the branching pipes therebetween, a line of magnetic force generated between the permanent magnets 49 is made almost perpendicular to the stream of the pure water, and thereby the magnetic force can be made stronger. Since the branching pipes 45 are per se formed from non-magnetic material, stainless steel (SUS-304), the line of magnetic force thus generated is never influenced by the material of the branching pipes 45. That is, the line of magnetic force is stabilized and the permanent magnets 49 exert sufficient strength.

In the pure water on which the strong magnetic force has acted, a mass of molecules called "cluster" becomes smaller. In other words, magnetization of water is carried out. The magnetized water thus obtained is very suitable for lotions.

The pure water is continuously circulated through the cyclic water channel 37 with being magnetized, and as a result the water thoroughly magnetized is stored in the pure water tank 9. After the lapse of 24 hours, the manufacturing of magnetized water is completed, and the magnetized water can be discharged from the use point.

If it is necessary to disassemble the magnetic force generator 31 for the purpose of maintenance inspection, the press board 55 is removed, whereby the magnet encasing board 51 separates from the branching pipes 45. Therefore, the permanent magnets 49 encased in the magnet encasing board 51 can be easily replaced. During the replacement, the three branching pipes 45, the chambers 43 and the connecting pipes 41 can be still connected with the cyclic water channel 37. Hence, the maintenance inspection of the magnetic force generator 31 can be carried out without stopping the circulation of the pure water.

The effects of this embodiment are described below.

According to this embodiment, as mentioned above, the magnetic force generator 31 magnetizing pure water is not provided in the pure water tank 9 but provided midway in the cyclic water channel 37, and hence the size of the magnetic force generator 31 can be made smaller. Accordingly, the size of the whole apparatus for manufacturing magnetized water can be made smaller.

Further, there is provided the magnetic force generator 31 having the magnets disposed outside the branching pipes 45 which constitute a part of the cyclic water channel 37, and hence bacteria hardly enter into the pure water in the maintenance inspection of the magnetic force generator 31. Accordingly, the apparatus of this structure is more sanitary as compared with a conventional case where the magnets 49 are provided in the pure water tank 9.

When the magnetic force generator 31 is provided in the pure water tank 9, the water present in the narrow gap between pairs of the permanent magnets 49 is inevitably in the still state. In this embodiment, however, only running water is present between pairs of the permanent magnets 49, and hence the apparatus of the invention is sanitary.

In this embodiment, the section of the branching pipe 45 is in the form of a long and narrow rectangle, and therefore a magnetic force of sufficient strength can be obtained by making the shorter side of the rectangle section as short as possible. In addition, if the longer side of the rectangle section is made as long as possible, the sectional area can be made large thereby to secure an enough flow rate. In other words, by making the sectional area large, the resistance in the passageway at the branching pipes 45 of the cyclic water channel 37 can be lowered, and hence the discharge pressure of the pump 27 does not need to be so high. Accordingly, the pump 27 does not need to have so good performance.

While the magnetized water manufacturing apparatus of this embodiment continuously works, a necessary quantity of the magnetized water is discharged from the use point 35, and the same amount of pure water is fed by way of the pretreatment device 3. Because it is unnecessary to stop the stream of the pure water in the cyclic water channel 37 even when the magnetic force generator 31 is inspected for maintenance, the above working of the apparatus does not need to be stopped.

As described above, the permanent magnet 49 is in the form of a flat rectangular parallelepiped and the length directions of the rectangular parallelepiped are parallel with the direction of the stream of the branching pipes 45. Hence, the zone where the line of magnetic force is generated can be widened in the direction of the stream, whereby the time (distance) in which the pure water is magnetized can be made longer.

The modifications of the invention or other embodiments than the above-described one will be described below.

In the above embodiment, the permanent magnets 49 of the magnetic force generator 31 are arranged in pairs, but in other embodiment, one permanent magnet in the form of an arc may be arranged in such a manner that its both ends (both poles) face each other through the branching pipes 45.

In the above embodiment, further, the magnetic force generator 31 used for the magnetized water manufacturing apparatus employs permanent magnets 49, but instead, electromagnets may be employed in other embodiment.

Figure 8:
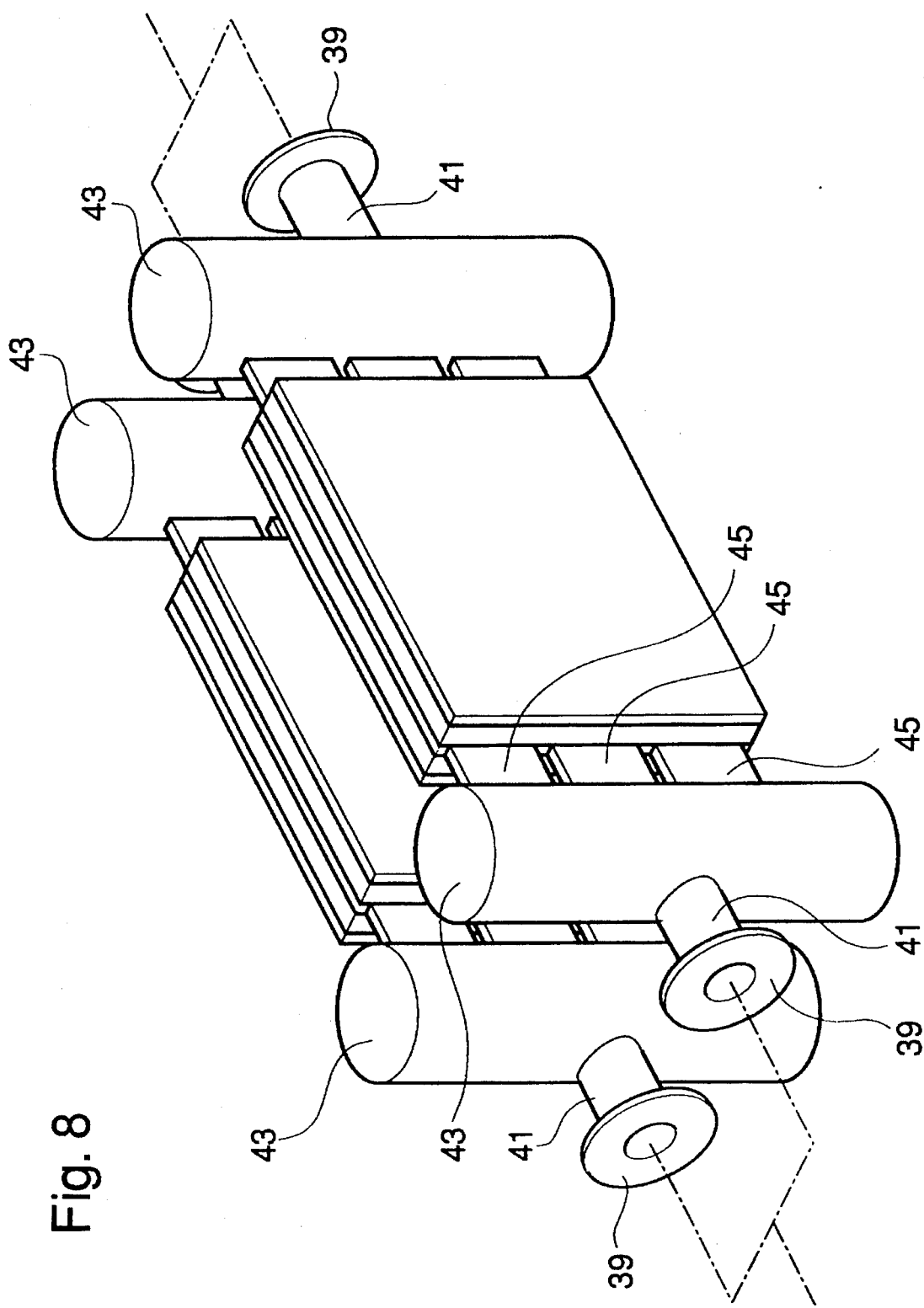
FIG. 8 is a view showing magnetic force generators of FIG. 2 arranged in parallel.
Figure 9:
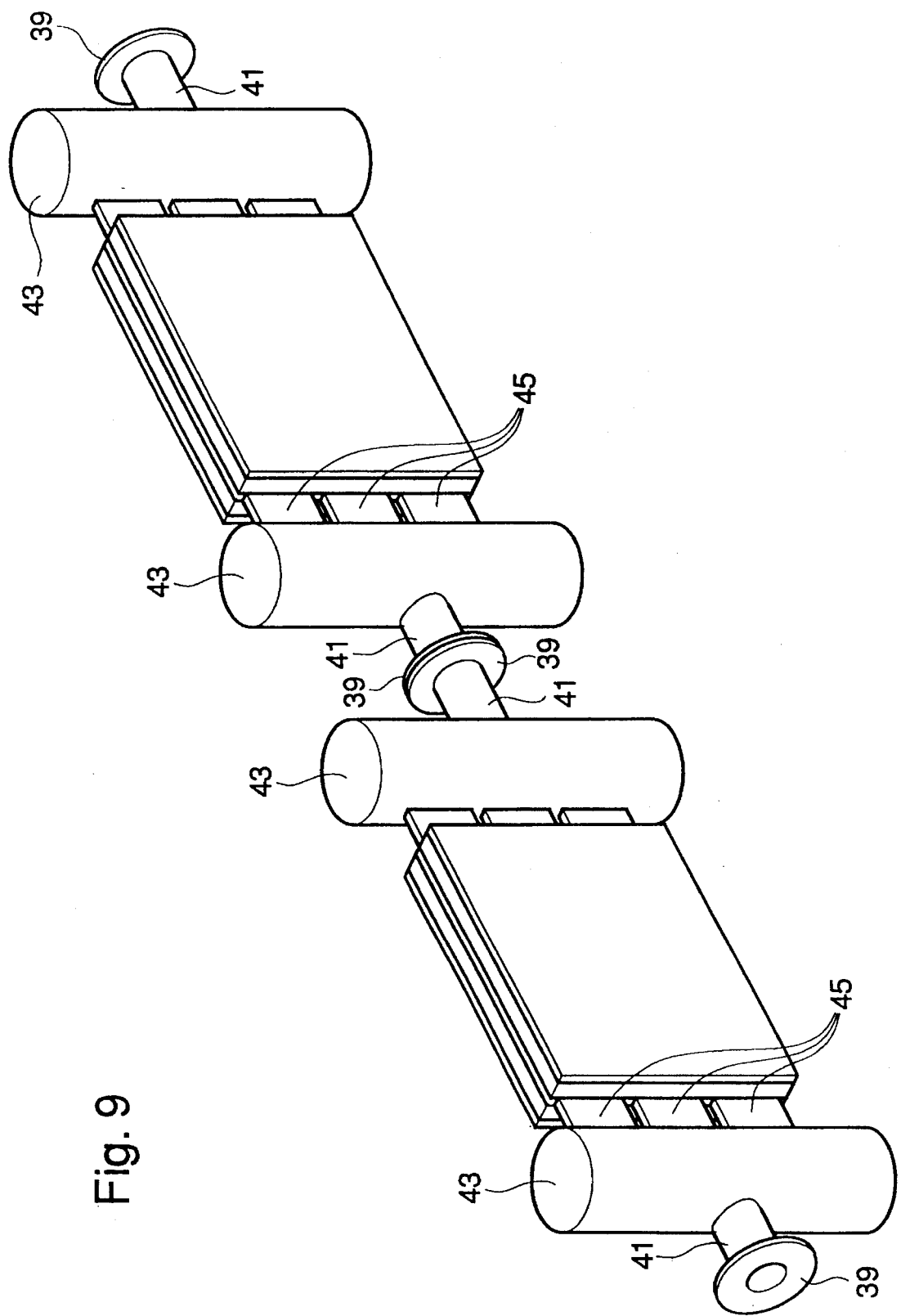
FIG. 9 is a view showing magnetic force generators of FIG. 2 arranged in series.

In the above embodiment, moreover, one magnetic force generator 31 is provided in the cyclic water channel 37, but in other embodiment, plural magnetic force generators may be arranged in parallel in the cyclic water channel as shown in FIG. 8. By arranging the plural magnetic force generators 31 in parallel, the total sectional area of the branching pipes 45 can be enlarged, whereby the resistance in the passageway at the magnetic force generators can be reduced so as to lighten a burden of the pump 27. In addition, the arrangement of the plural magnetic force generators 31 in parallel makes it possible to manufacture a large quantity of magnetized water at the same time.

Furthermore, plural magnetic force generators 31 may be provided in series in the cyclic water channel 37. By arranging the plural magnetic force generators 31 in series, the pure water passes through the plural magnetic force generators 31, that is, the pure water receives the action of the magnetic force many times, whereby magnetization of the pure water can be effectively performed.

In the above embodiment, the non-magnetic material for forming the branching pipes 45 is stainless steel, but in other embodiment, other non-magnetic materials than stainless steel, i.e., ceramics, may be employed.

The structure of the magnetized water manufacturing apparatus of the invention is explained hereinbefore with reference to some embodiments. The magnetized water manufactured by the apparatus of the invention having such structure is high in the degree of magnetization and shows high quality, and it is presumable that water molecule groups called "clusters" are much smaller than those of ordinary tap water. The size of the cluster can be measured by a nuclear magnetic resonance (NMR) measuring device as described later.

That is to say, an atomic nucleus has a positive charge and an electron which revolves around the nucleus has a negative charge, so that the minimum unit of a substance can be regarded as a magnet. When this small magnet is placed in a static magnetic field, the magnet comes to point to some limited directions. When the nuclear spin is ½ (simplest case), the magnet comes to point to two limited directions, whereby there arises an energy difference between those two states. In other words, one state is more stable than the other state. If the nucleus in this low energy state absorbs energy somehow, the nucleus can get to the high energy state. Accordingly, when energy is given in the form of electromagnetic wave to a nucleus, the nucleus absorbs the electromagnetic wave and gets to the high energy state. A phenomenon that a certain substance system absorbs energy of specific electromagnetic wave as described above is called "resonance phenomenon". This energy can be taken out as a signal, and the energy taken out as the signal is NMR. The nuclear magnetic resonance can be measured by a NMR measuring device.

In general, a water molecule $H_2O$ does not exist alone, but exists in the polymeric form called "cluster" mentioned above. In more detail, water is in the state of clusters of 36~37 molecules, holding S, C, Cl, Hg, Pb, Cd and the like.

The water molecule state has influence on the nuclear magnetic resonance phenomenon, and therefore the state of the water molecule cluster can be judged by measuring the energy absorbed in the resonance phenomenon. More specifically, it is thought that the state of the water molecule cluster can be known by a half band width (line width) of a peak shown in a chart obtained by the $^{17}O$-nuclear magnetic resonance measurement using a NMR measuring device. That is, the line width is a value expressed as a reciprocal of the interference time (frequency: Hz), and it can be thought that the wider the line width is, the larger the number of the connecting water molecules is, and this indicates that the size of the cluster is large and the degree of magnetization is low. On the other hand, it can be construed that the narrower the line width is, the smaller the number of the connecting water molecules is, and this indicates that the size of cluster is small and the degree of magnetization is high.

When the $^{17}O$-nuclear magnetic resonance of water was measured at an observation center frequency of 54.1 MHz at room temperature to obtain a chart and a line width is read from the chart, tap water has a line width of 110 to 150 Hz, Evian (trade name) has a line width of 102 to 120 Hz, mineral water has a line width of 80 to 110 Hz, natural spring water has a line width of 70 to 150 Hz, and hot spring water has a line width of 58 to 90 Hz, each on an average.

The average value of the line width of the tap water is in the range of 110 to 150 Hz and considerably high. With regard to the height of the average value of the line width, the tap water is followed by Evian, mineral water, natural spring water and hot spring water in this order, and the hot spring water reveals the lowest value. Also from this fact, it can be understood that water having such a high quality as required for drinking water or lotions generally has a small line width and a high degree of magnetization.

According to the apparatus for manufacturing magnetized water of the invention, tap water or natural spring water of low quality, which has a large line width in a chart obtained by the $^{17}O$-nuclear magnetic resonance measurement using a NMR measuring device as described later, can be highly magnetized, whereby magnetized water of high quality which has a small line width and is almost free from change of the line width with time can be manufactured.

EFFECT OF THE INVENTION

According to the magnetized water manufacturing apparatus of the invention, as described hereinbefore, the water sent from the water tank receives the action of a magnetic force generated by the magnetic force generator provided in the cyclic water channel, and becomes magnetized water, which is returned to the water tank. Therefore, if the cyclic water channel is sufficiently narrowed, it becomes possible to allow a strong magnetic force to act on the water. Accordingly, the size of whole apparatus can be made smaller. Even if the cyclic water channel in which running water is present is narrowed, the apparatus of the invention does not become insanitary as compared with the conventional apparatus in which still water is present. In the apparatus of the invention, moreover, the magnetic force generator generates a line of magnetic force which is almost perpendicular to the water stream, and hence a stronger magnetic force can be allowed to act on the water. As a result, magnetized water of high quality can be more easily manufactured.

According to the magnetic force generator of the invention, only the permanent magnets can be replaced by unfixing the press board, and hence it is unnecessary to replace the whole magnetic force generator, resulting in economical effects.

The function of the magnetized water manufacturing apparatus according to the invention will be further described with reference to the following reference example and working example.

REFERENCE EXAMPLE 1

Tap water collected at Akishima-shi and Nerima-ku in Tokyo was measured on their $^{17}O$-NMR using a NMR measuring device (produced by NIHON DENSHI K.K., type: JNM-EX 400 under the conditions set forth in Table 1. The $^{17}O$-NMR chart obtained is shown in FIG. 14.

TABLE 1

| Items of Measuring Conditions | Measuring Conditions |
| --- | --- |
| Nucleus | $^{17}O$ |
| Measuring temperature | 22° C. |
| Pulse sequence | single pulse |
| Measuring center frequency | 54.10 MHz |
| Number of data points | 16,384 |
| Measuring region | 10,000.0 Hz |
| Number of integrating times | 2,048 |
| Pulse repetition time | |
| Peak attenuation time | 0.051 second |
| Pulse interval | 0.100 second |
| Pulse width | 15.5 microseconds |

In FIG. 14, A is a chart obtained by measuring the tap water of Akishima-shi, and B is a chart obtained by measuring the tap water of Nerima-ku. By comparison between the tap water of Akishima-shi and the tap water of Nerima-ku, as is clear from FIG. 14, the line width HW of the peak shown in the chart A of the tap water of Akishima-shi is 84 Hz, the line width HW of the peak shown in the chart B of the tap water of Nerima-ku is 124 Hz. From the results, it has been confirmed that the line width of the tap water of Nerima-ku is within the aforesaid range (110 to 150 Hz) of the average line width of tap water, while the line width of the tap water of Akishima-shi is smaller than the average line width, and hence the tap water of Akishima-shi has relatively small clusters and a high degree of magnetization.

WORKING EXAMPLE 1

Figure 10:
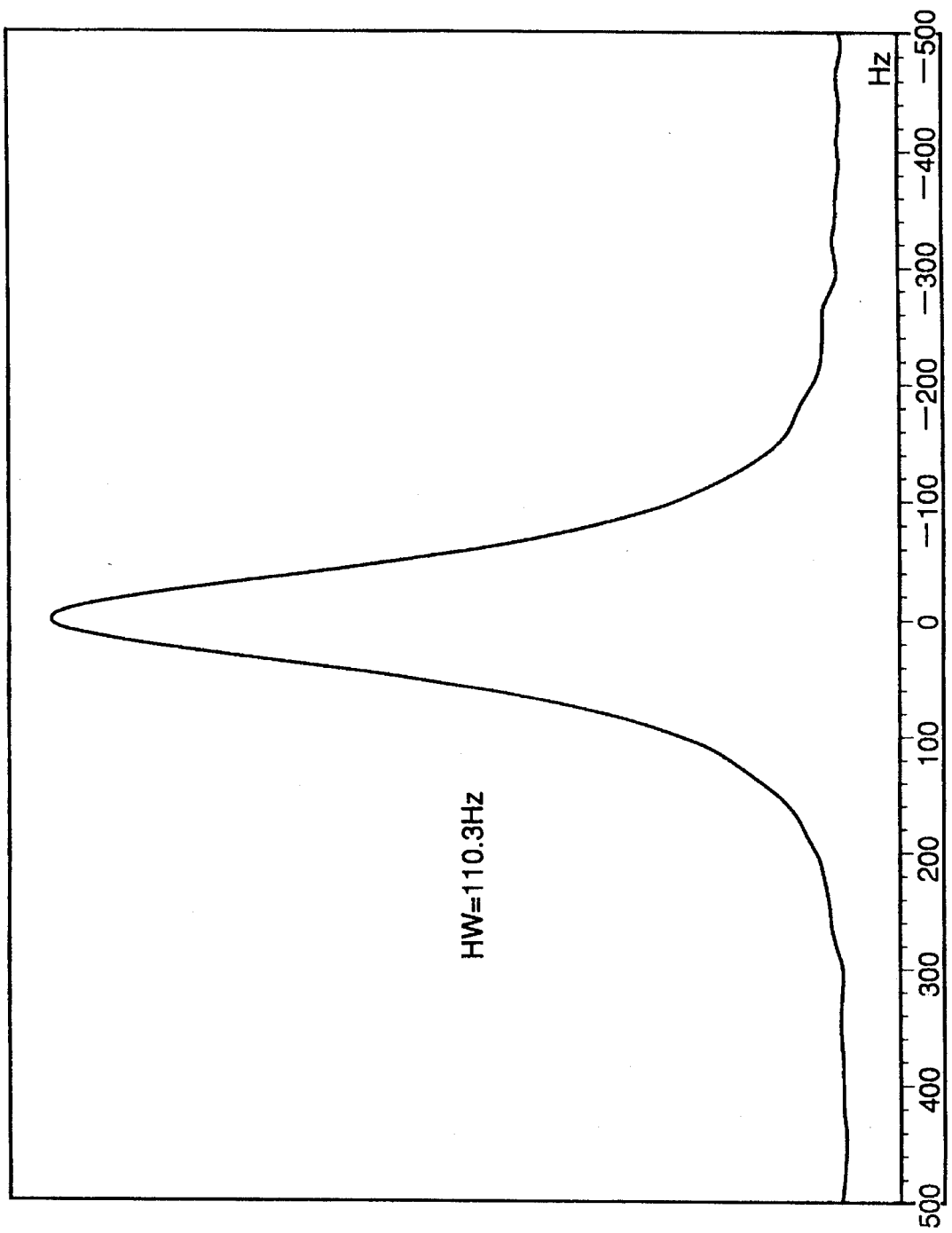
FIG. 10 is a graph showing $^{17}$O-NMR chart obtained by measuring a tap water of Osaka Prefecture.

Ordinary water (tap water of Kashihara-shi in Osaka Prefecture) was measured on its $^{17}O$-NMR in the same manner as described in Reference Example 1. The $^{17}O$-NMR chart obtained is shown in FIG. 10. After the ordinary water was allowed to stand for 17 days, the ordinary water was measured on its $^{17}O$-NMR again and was observed on the change of the line width with time. The $^{17}O$-NMR chart obtained is shown in FIG. 12.

Figure 11:
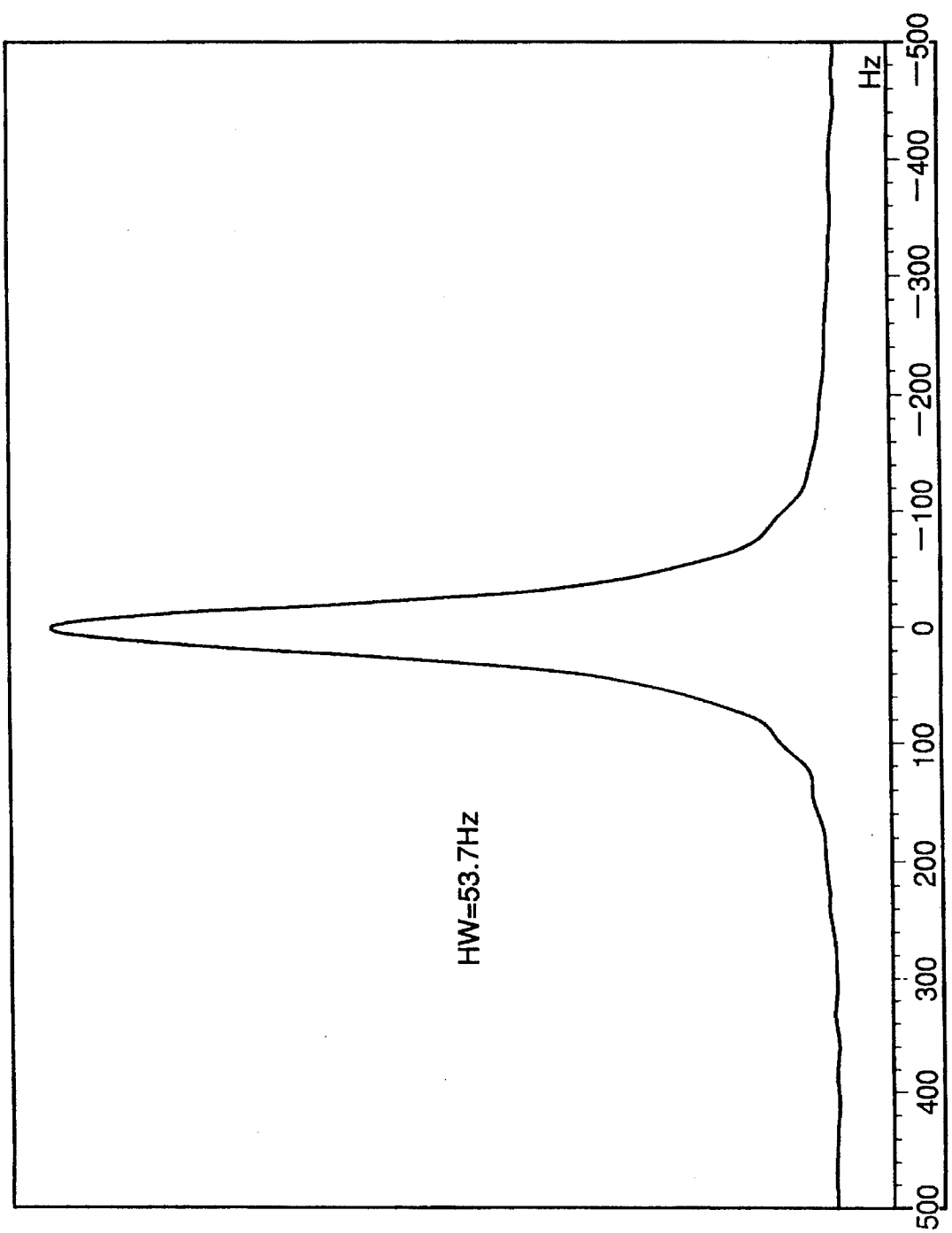
FIG. 11 is a graph showing $^{17}$O-NMR chart obtained by measuring a magnetized water by the apparatus of the present invention.

Subsequently, magnetized water was manufactured from the above ordinary water using the magnetized water manufacturing apparatus of the aforementioned embodiment (FIG. 1 to FIG. 7). The magnetized water was measured on its $^{17}O$-NMR in the same manner as described in Reference Example 1. The $^{17}O$-NMR chart obtained is shown in FIG. 11. After the magnetized water was allowed to stand for 17 days, the magnetized water was measured on its $^{17}O$-NMR again and was observed on the change of the line width with time. The $^{17}O$-NMR chart obtained is shown in FIG. 13.

Figure 12:
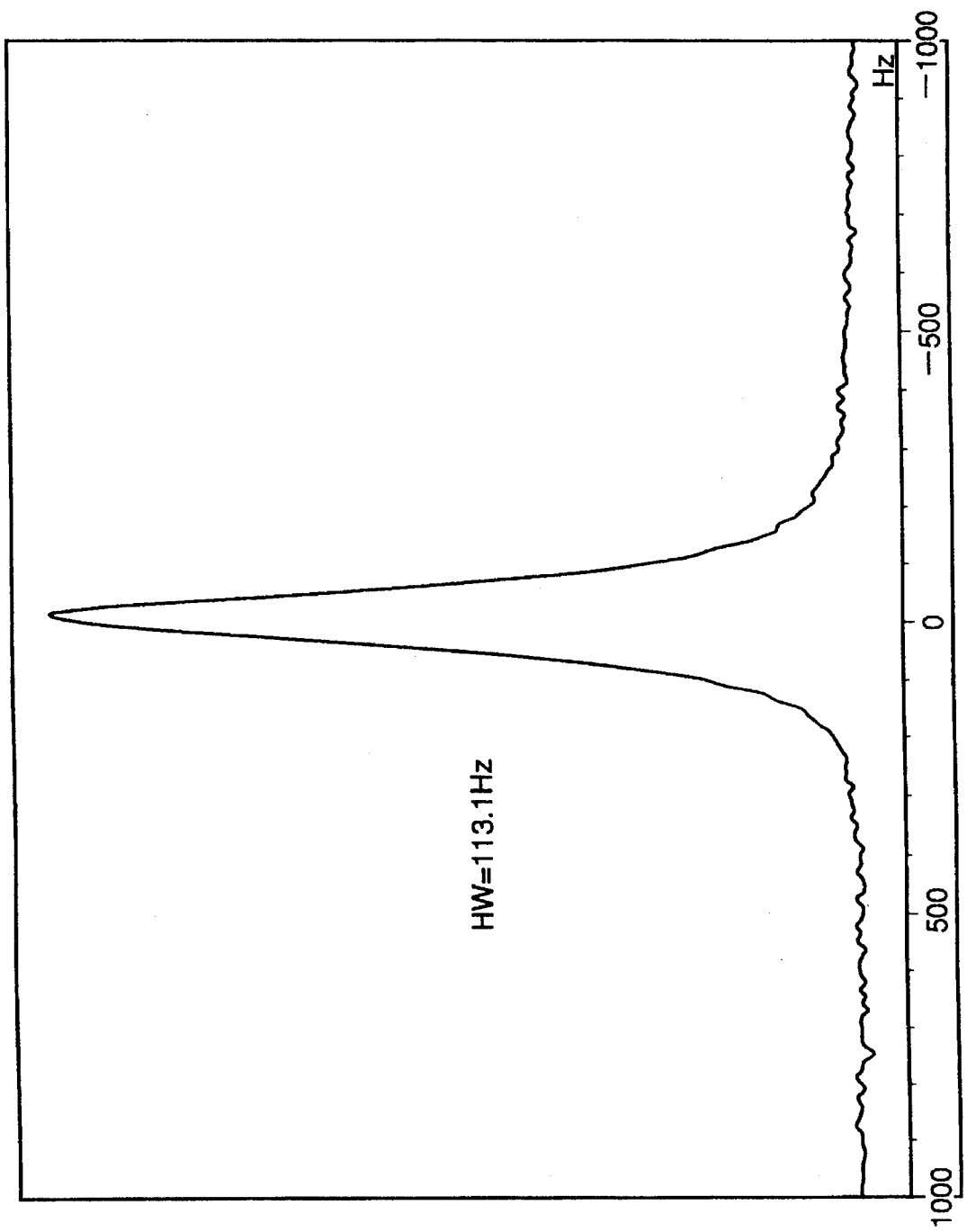
FIG. 12 is a graph showing $^{17}$O-NMR chart obtained by measuring the tap water after 17 days.

As shown in FIG. 10 and FIG. 12, the line width HW obtained from the $^{17}O$-NMR chart of the ordinary water is 110.3 Hz in the first measurement, and it is 113.1 Hz in the second measurement. The line width of the ordinary water used as raw water is within the aforesaid range (110 to 150 Hz) of the average line width of tap water, and it is midway between the line width (124 Hz) of the tap water of Nerima-ku and the line width (84 Hz) of the tap water of Akishima-shi.

Figure 13:
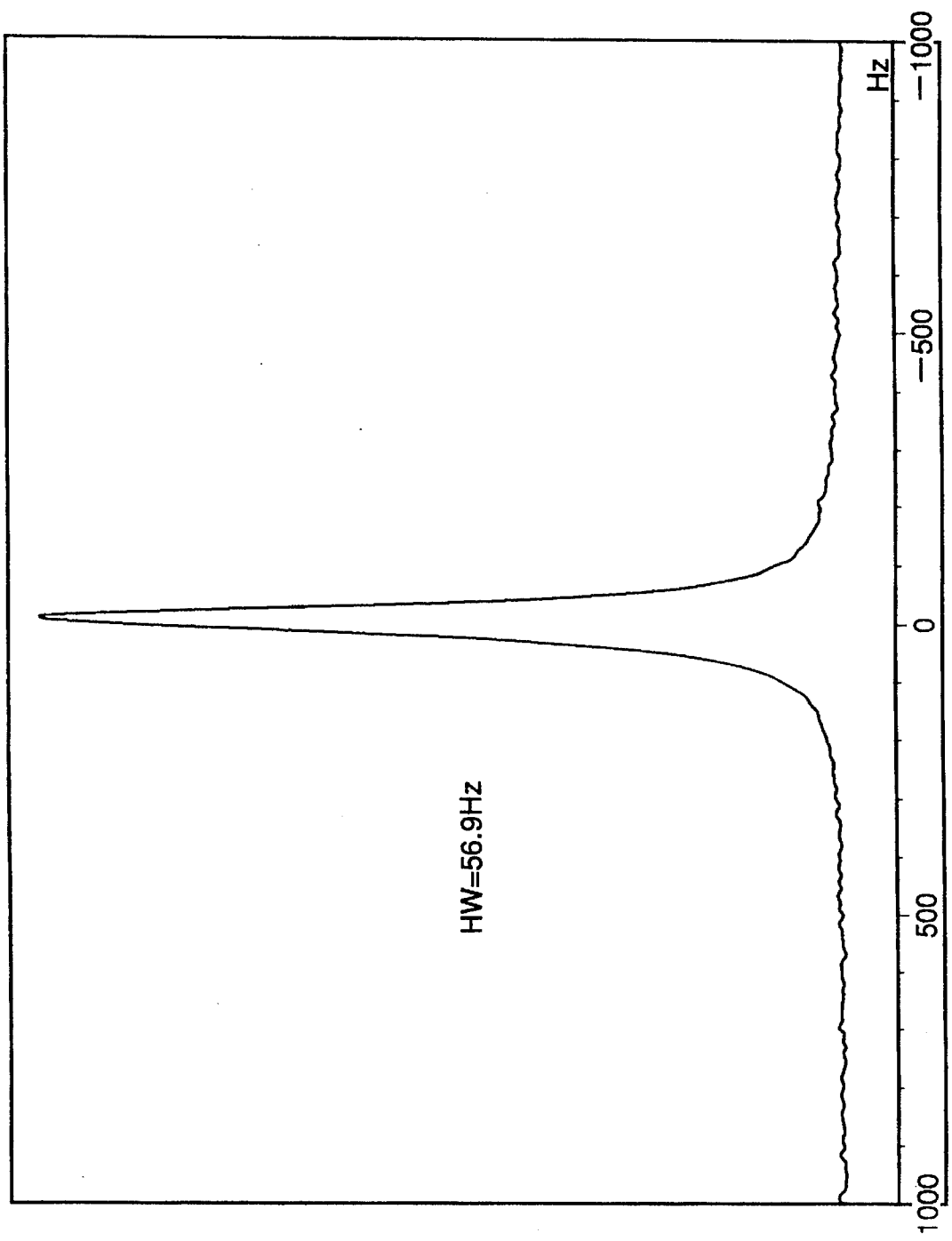
FIG. 13 is a graph showing $^{17}$O-NMR chart obtained by measuring the magnetized water after 17 days.

As shown in FIG. 11 and FIG. 13, the line width HW obtained from the $^{17}O$-NMR chart of the magnetized water manufactured from the above ordinary water is 53.7 Hz in the first measurement, and it is 56.9 Hz in the second measurement.

By comparison between the ordinary water and the magnetized water on the line width of the first measurement, the line width of the ordinary water (raw water of the magnetized water) is 110.3 Hz (see: FIG. 10), while the line width of the magnetized water manufactured from the ordinary water using the apparatus of the invention is 53.7 Hz (see: FIG. 12), and the line width of the magnetized water is reduced to about ½ of the line width of the ordinary water.

The line width of the magnetized water is much lower than the line width of the ordinary water used as the raw water, as well as than any of the line width of the tap water in the Reference Example 1. From this fact, it has been confirmed that magnetized water of much higher quality than the tap water can be manufactured from the tap water by the use of the apparatus of the invention.

The change with time of the ordinary water and the magnetized water on the line width was examined from the results of the second measurement. As a result, the line width of the ordinary water changed to 113.1 Hz (see: FIG. 11) from 110.3 Hz after 17 days and the increase is only less than 3%, while the line width of the magnetized water changed to 56.9 Hz (see: FIG. 13) from 53.7 Hz after 17 days and the increase is only less than 6%.

The difference in the line width between the first measurement and the second measurement is very small in both cases, and it can be said that the difference is within the error range. Accordingly, it has been confirmed that the quality of the magnetized water manufactured by the apparatus of the invention is stably kept for 17 days as well as the ordinary water.

From the above results, it was understood that since the line width in the chart of the magnetized water obtained by the $^{17}O$-nuclear magnetic resonance measurement using a NMR measuring device is small and the change of the line width with time is also small, the magnetized water manufacturing apparatus according to the invention can manufacture magnetized water of high and stable quality.

What is claimed is:

1. An apparatus for manufacturing magnetized water comprising:

water tank for storing water to be treated;

a pump connected to said tank for sending forth the water from the tank;

a cyclic water channel connected to said pump for returning the water to the tank; and a magnetic force generator disposed midway in the cyclic water channel for generating a line of magnetic force substantially perpendicular to the water stream, wherein said magnetic force generator comprises a water channel main body constituting a part of the cyclic water channel and being formed from a non-magnetic material, wherein said main body includes a pair of opposing longer sides interconnected by a pair of opposing shorter sides to form a channel having a rectangular cross section;

a plurality of pairs of permanent magnets each having a first polar surface abutting a respective said longer side of said main body and a second polar surface facing away from the respective longer side of said main body, said pairs of permanent magnets interposing the water channel main body therebetween so as to allow different magnetic poles of the magnets to face each other;

a pair of magnet encasing boards each having opposing first and second surfaces wherein the first surfaces of said boards abut the respective said longer sides of said main body, each said magnet encasing board having a plurality of apertures extending through said first and second surfaces, each said aperture receiving a respective one of the magnets therein, said magnet encasing boards being removable from the water channel main body; and a pair of removable press bards each having a surface cooperating with the respective said second surface of the magnet encasing boards and the respective said second polar surfaces of the magnets to hold together the water channel main body and the magnet encasing boards.

2. The apparatus for manufacturing magnetized water as claimed in claim 1, wherein said permanent magnets are removable from the magnet encasing board.

3. The apparatus for manufacturing magnetized water as claimed in claim 2, wherein plural magnetic force generators are arranged in parallel in the cyclic water channel.

4. The apparatus for manufacturing magnetized water as claimed in claim 2, wherein plural magnetic force generators are arranged in series in the cyclic water channel.

5. The apparatus for manufacturing magnetized water as claimed in claim 1, wherein plural magnetic force generators are arranged in parallel in the cyclic water channel.

6. The apparatus for manufacturing magnetized water as claimed in claim 1, wherein plural magnetic force generators are arranged in series in the cyclic water channel.

7. A magnetic force generator for manufacturing magnetized water provided midway in a water channel for generating a line of magnetic force substantially perpendicular to the water stream comprising:

a water channel main body constituting a part of the water channel and being formed from a non-magnetic material, wherein said main body includes a pair of opposing longer sides interconnected by a pair of opposing shorter sides to form a channel having a rectangular cross section;

a plurality of pairs of permanent magnets each having a first polar surface abutting a respective said longer side of said main body and a second polar surface facing away from the respective longer side of said main body, said pairs of permanent magnets interposing the water channel main body therebetween so as to allow different magnetic poles of the magnets to face each other;

a pair of magnet encasing boards each having opposing first and second surfaces, wherein the first surfaces of said boards abut the respective said longer sides of said main body, each said magnet encasing board having a plurality of apertures extending through said first and second surfaces, each said aperture receiving a respective one of the magnets therein, and said magnet encasing boards being removable from the water channel main body; and a pair of removable press boards each having a surface cooperating with the respective said second surface of the magnet encasing boards and the respective said second polar surfaces of the magnets to hold together the water channel main body and the magnet encasing boards.

* * * * *

UNITED STATES PATENT AND TRADEMARK OFFICE
CERTIFICATE OF CORRECTION

PATENT NO. : 5,584,994
DATED      : December 17, 1996
INVENTOR(S) : Toshimitsu Hattori and Masaru Ohta It is certified that error appears in the above-indentified patent and that said Letters Patent is hereby corrected as shown below:

Column 3 Line 64 "allow" should read --a flow--.

Column 3 Line 66 "22" should read --27--.

Column 4 Line 4 "32" should read --31--.

Column 6 Line 2 before "magnetizing" insert --for--.

Column 8 Line 40 "size of whole" should read --size of the whole--.

Claim 1 Line 5 Column 11 "bards" should read --boards--.

Signed and Sealed this

Sixth Day of May, 1997

Attest:

BRUCE LEHMAN

*Attesting Officer*   *Commissioner of Patents and Trademarks*